United States Patent Office 3,528,324
Patented Sept. 15, 1970

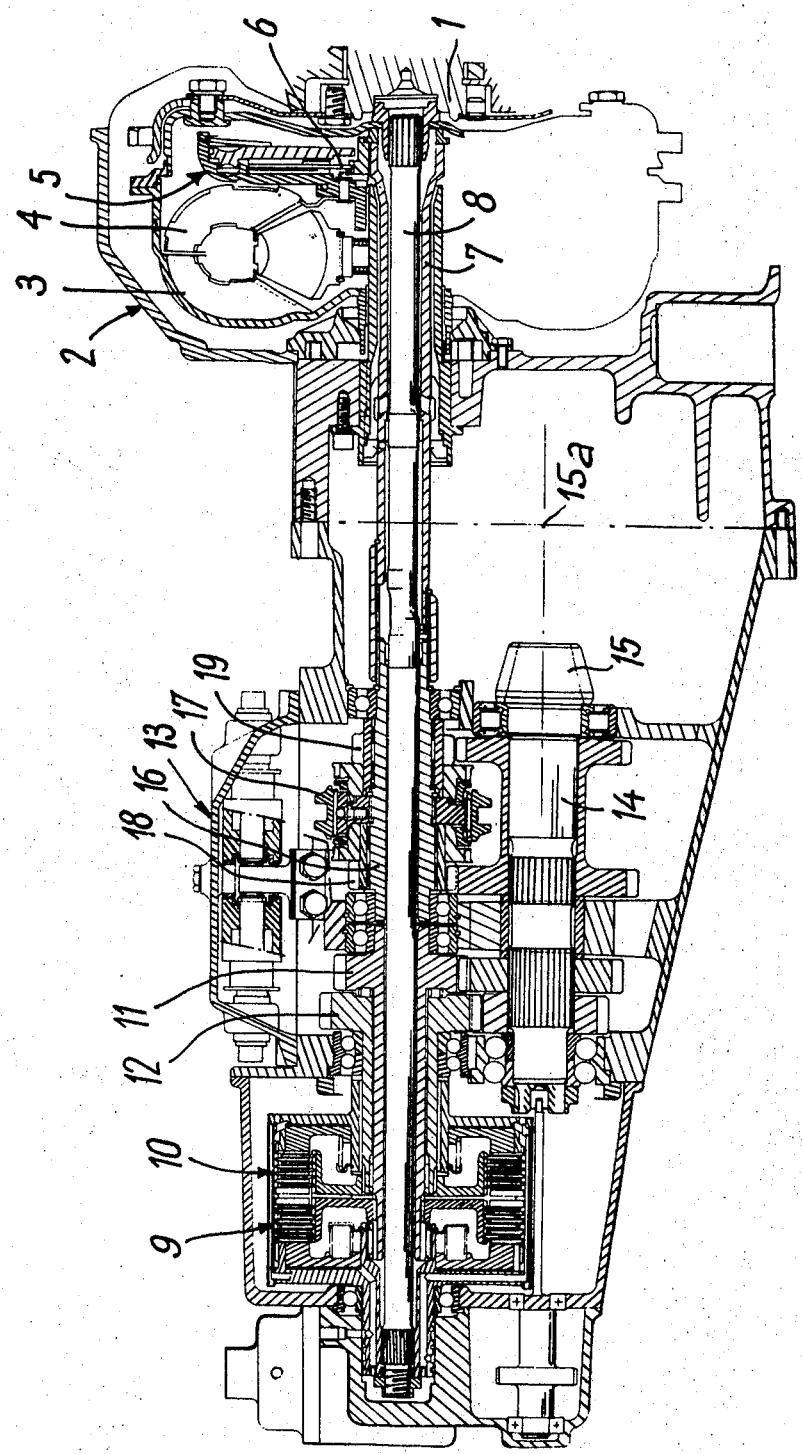

3,528,324
AUTOMATIC GEAR BOXES FOR AUTOMOBILES
Raymond A. Ravenel, Sceaux, France, assignor to Societe Anonyme Andre Citroen, Paris, France, a French society
Filed Jan. 23, 1968, Ser. No. 699,872
Claims priority, application France, Jan. 26, 1967, 92,566
Int. Cl. F16h *47/00;* F16d *67/00*
U.S. Cl. 74—720
3 Claims

ABSTRACT OF THE DISCLOSURE

This invention relates to automatic gear boxes for automobiles, of the kind that comprise a hydraulic converter having an output in the form of two coaxial shafts passing into the gear box, the outer shaft being coupled to a turbine element of the converter by means of a clutch. According to the present invention, the reverse drive torque and the highest gear reduction torque in forward drive each comprise a loose pinion and a keyed pinion mounted on said outer shaft and on the output shaft of the gear box. These two loose pinions are mounted on a common shaft and are selectively securable to said shaft by a coupling and synchronisation device.

---

The present invention relates to improvements in automatic gear boxes for automobiles. The invention is more particularly applied to those gear boxes that comprise a hydraulic converter arranged between the drive shaft and the gear box itself. Various types of automatic gear boxes of this kind are already known in which two concentric shafts pass into the gear box. The outer shaft may be coupled to a turbine element of the converter by means of a clutch. The inner shaft may either be directly fixed to said turbine element of the converter or may be connected to the drive shaft.

In any case, in gear boxes of known types, the output of the converter is constituted by two coaxial shafts, the outer shaft always being disconnectible from the turbine element of the converter.

The invention has for an object improvements in automatic gear boxes of the above mentioned type, and relates more particularly to an arrangement of the gear box enabling certain disadvantages, encountered when conventional gear boxes are coupled to two coaxial shafts by means of clutches, to be eliminated, or minimised.

An automatic box is, in fact, known, particularly in a patent application in the name of Societe Anonyme Andre Citroen, in which the selection of the highest reduction ratio in forward drive or of the reverse drive ratio, is obtained by means of a selector rod which may be coupled selectively to one or the other of the pinions of said ratios. However, during selection, the selector rod or the pinions are securely connected, in rotation, with members having a high inertia, so that the synchronisation devices are subjected to operational conditions which are prejudicial to their duration.

According to the present invention, the reverse drive torque and the highest gear reduction torque (first gear) in forward drive, each comprise a loose pinion and a keyed pinion mounted on the outer shaft leaving the converter and on the output shaft of the box. The two loose pinions are mounted on the same shaft, either on the outer shaft or on the output shaft and may be fixed selectively to said shaft by a coupling and synchronisation device known per se.

The invention will be more readily understood with the aid of the following description, given by way of example, in the course of which secondary characteristics as well as the advantages of the invention will appear. Reference will be made to the single accompanying drawing which is a sectional view through a vertical plane of an automatic gear box according to the invention.

The principle members of this gear box will firstly be designated before describing the new part according to the invention.

A torque converter 2 of known type is coupled to the shaft 1 of the engine by its pump element 3. The turbine element 4 of this converter is coupled to a mechanical clutch 5, the output member 6 of which is fixed to a first and hollow shaft 7.

Inside this latter is concentrically mounted a second shaft 8 securely fixed in rotation to the pump element, 3. At its opposite end, the second shaft 8 is coupled to the common driving member of two mechanical clutches 9, 10, respectively.

The driven members of these clutches 9 and 10 are connected by two hollow shafts concentric to the second shaft 8, to pinions 11 and 12 respectively. These latter form part of a gear box generally shown at 13.

It will be noted that this box 13 is placed between the converter 2 and the two mechanical clutches 9, 10.

In the lower part of this box 13 is located an intermediate shaft 14 carrying at one end a tapered pinion 15 which may drive the rim of a differential (not shown), the central longitudinal axis of which would be at 15a. The whole of this arrangement is particularly advantageous for vehicles referred to as having front wheel drive or rear wheel drive assembly in which the axle nearest the engine is also the axle driving the vehicle.

It has just been shown, on describing the shaft 8, that the torque driving the vehicle may follow a path by which it completely passes through the box 13 and returns to this box either on the pinion 11 or on the pinion 12 at the end of the box through which it left.

The first shaft 7 will now be considered, it being securely connected to the output member 6 of the mechanical clutch 5 incorporated with the converter 2.

This shaft 7 is extended by a sleeve 16 which passes into the box 13 and extends to a point adjacent the pinion 11. There is mounted on the sleeve 16, so as to be fixed in rotation and movable in translation, a sliding pinion 17 which may be coupled, by means of a synchronisation device, with one or the other of two toothed pinions 18, 19.

The pinion 18 cooperates directly with another pinion fixed on the shaft 14 whilst pinion 19 mates with a reversing pinion which cooperates with another pinion which is also fixed to the shaft 14.

Examination of the shaft 7 shows that the torque driving the vehicle may follow another path by which it passes into the box 13 through the same end as previously, but this time it does not leave.

The operation of the gear box which has just been described is as follows:

Upon starting, the mechanical clutch 5 is put into operation whilst clutches 9 and 10 are inactive. The driving torque which passes through the converter 2 reaches, through the clutch 5, the selector rod 17. When the latter is coupled to the pinion 19 the vehicle is driven in reverse; when it is coupled to pinion 18 the vehicle starts moving forwards in first gear.

As the speed increases the mechanical clutch 5 is rendered inactive the clutch 9 is closed and drive is effected through the pinion 11 in second gear. Finally the clutch 9 is rendered inactive and clutch 10 is closed; drive is effected through the pinion 12 in third gear.

It will be noted that in second and third gears, the hydraulic converter 12 is no longer traversed by the torque provided by the engine.

In another embodiment were fewer drive ratios are provided, the clutch 10 and the pinion 12 may be eliminated.

Of course, the control of the mechanical clutches 5, 9 and 10 may depend upon a speed and/or torque detector as is known. To this end, each of the moving members of these clutches is associated with a hydraulic jack; this part of the embodiment has not been described because it is known per se and, therefore, does not form part of the invention.

The particular advantages given by the invention are the compactness of the transmission assembly, the gain in length which results therefrom, the input (through the concentric shafts 7 and 8) and the output (through the tapered pinion 15) of the drive torque situated on the same side of the box 13. In addition, the central shaft 8 which transmits the torque whilst avoiding the converter 2 for the ratios 2 and 3 also acts as a torsion damper, due to its length.

Moreover, when it is desired to mate the sliding pinion 17 with one or other of the pinions 18, 19, the synchronisation device has to overcome the inertia of the sleeve 16, the shaft 7 and the relatively light output shaft 6 of the clutch 5 only.

It will be apparent that various modifications may be made to the shape of the members and to their relative arrangements.

I claim:

1. An automatic gear box for an automobile comprising an input shaft operatively connected to an automobile engine, an output shaft, a hydraulic converter including a pump member rigidly fixed to the input shaft and a turbine member adapted to be operatively connected to said output shaft, a selectively engageable and disengageable friction clutch interposed between said output shaft and said turbine member, said clutch when engaged providing a positive operable connection between said output shaft and said turbine member whereby said turbine member is operable to drive said output shaft and said latter shaft is operable to drive said turbine member, a gear box axially displaced from said converter, said output shaft being hollow and passing into said gear box, said input shaft having an extension part passing through said hollow output shaft and extending into said gear box, said gear box having a reverse gear pinion and a lowest gear pinion loosely mounted on said hollow output shaft, a gear box output shaft having pinion means fixedly mounted thereon, and a coupling and synchronisation means for selectively connecting the reverse gear pinion and the lowest gear pinion for rotation with said hollow output shaft whereby said selected pinion directly drives said pinion means and said gear box output shaft, said output shaft also being operable to drive said input shaft and said automobile engine whereby the latter functions as a brake.

2. An automatic gear box according to claim 1 wherein said coupling and synchronisation means are interposed on said hollow output shaft between said reverse gear pinion and said lowest gear pinion.

3. An automobile gear box according to claim 1 wherein said clutch is disposed between said automobile engine input shaft and one side of said torque converter and said gear box is disposed on the opposite side of said torque converter.

References Cited

UNITED STATES PATENTS

| 2,511,039 | 6/1950 | Black et al. | 74—720 |
| 2,512,856 | 6/1950 | Fisk | 74—730 X |
| 2,747,430 | 5/1956 | Forester et al. | 74—732 |
| 2,844,974 | 7/1958 | Saives | 74—720 |
| 3,035,455 | 5/1962 | Peras | 74—732 X |
| 3,159,054 | 12/1964 | Gros | 74—732 |
| 3,316,778 | 5/1967 | Brueder | 74—720 X |
| 3,387,506 | 6/1968 | Cadiou | 74—732 |

FOREIGN PATENTS

| 1,266,619 | 6/1961 | France. |
| 720,210 | 12/1954 | Great Britain. |

DONLEY J. STOCKING, Primary Examiner

T. C. PERRY, Assistant Examiner

U.S. Cl. X.R.

74—730; 192—3.27